Fig.3.

F. T. ROBERTS.
PROCESS OF AND APPARATUS FOR MAKING HOLLOW RUBBER ARTICLES.
APPLICATION FILED OCT. 14, 1916.

1,219,351.

Patented Mar. 13, 1917.
4 SHEETS—SHEET 4.

INVENTOR;
Fred Thomas Roberts,
BY Albert H. Parts
ATT'Y

UNITED STATES PATENT OFFICE.

FRED THOMAS ROBERTS, OF CLEVELAND, OHIO.

PROCESS OF AND APPARATUS FOR MAKING HOLLOW RUBBER ARTICLES.

1,219,351.  Specification of Letters Patent.  Patented Mar. 13, 1917.

Application filed October 14, 1916. Serial No. 125,598.

*To all whom it may concern:*

Be it known that I, FRED THOMAS ROBERTS, a citizen of the United States, residing at Cleveland, in the county of Cuyahoga and State of Ohio, have invented a certain new and useful Improvement in Processes of and Apparatus for Making Hollow Rubber Articles, of which the following is a full, clear, and exact description, reference being had to the accompanying drawings.

This invention relates to the production of hollow rubber articles which may contain, either permanently or temporarily, an internal air pressure. A convenient illustration of such an article is a playing ball, though many sorts of articles may be constructed by the same process, for example, bulbs of various sorts, rubber toys, hot water bottles, tubes for pneumatic tires, etc., in all of which cases an internal fluid pressure is desirable, at least until after the article has been vulcanized. My invention provides an air-tight room of sufficient size to accommodate one or more workmen, and means for maintaining compressed air having the desired pressure, within the room. Access to the room or exit therefrom, for the operators, the molds and the materials, is effected by means of an air lock associated with the room. In this room the operator brings together, mechanically or by hand, the parts of the article, so as to entrap air within it. Thereafter, the article with such entrapped air, is held between mold members which are removed from the room and placed in a suitable vulcanizer, where the curing is completed.

In addition to the steps above broadly outlined, my process includes various other features, any or all of which may be employed, as desired. The first additional feature to which I call attention is the pneumatic forcing of rubber stock to its seat in forming molds by simply venting the mold cavities to the outside atmosphere, enabling the air pressure within the room to form the parts of the article before they are brought together to entrap air.

A second additional feature comprises the formation of the article pneumatically in a distorted mold which is arranged to have one or more inward protuberances properly supporting the stock so that the pneumatic action stretches it as desired and may maintain a wall of uniform thickness. The surface area of this distorted mold cavity is substantially the same as the area of the differently shaped cavity in the vulcanizing mold, enabling the article of distorted shape to assume the desired shape, due to its own elasticity or internal pressure, to substantially fit the vulcanizing mold, which is of the final shape. The reasons of this operation will be commented upon more at length hereinafter.

A third additional feature which may be employed in my process accomplishes the entrapping within the article of air of a higher pressure than suitable for the operator to continuously breathe, and of a higher pressure than the mere adherence of raw rubber parts would retain. This is effected by surrounding the separated mold members in the room by a casing into which compressed air of a higher pressure than that in the room may be forced.

Other specific features of operation which may be employed in my process will be hereinafter more fully explained. My invention includes also certain apparatus for effectively carrying out parts of the process, as hereinafter described.

The drawings illustrate the air-tight room and different forms of mechanism which may be used therein for carrying out my process.

Figure 1:
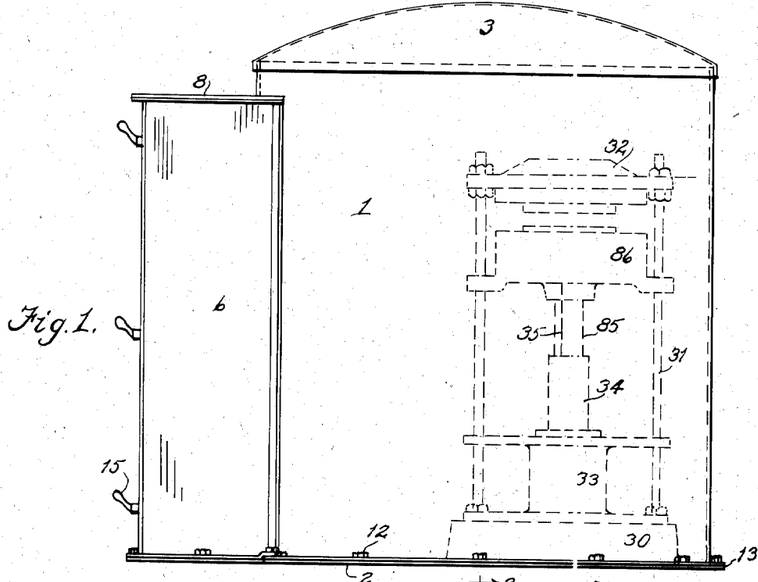
Figure 1 is a side elevation of the air room with its air lock, a suitable molding press within the room being shown in dotted lines.
Figure 2:
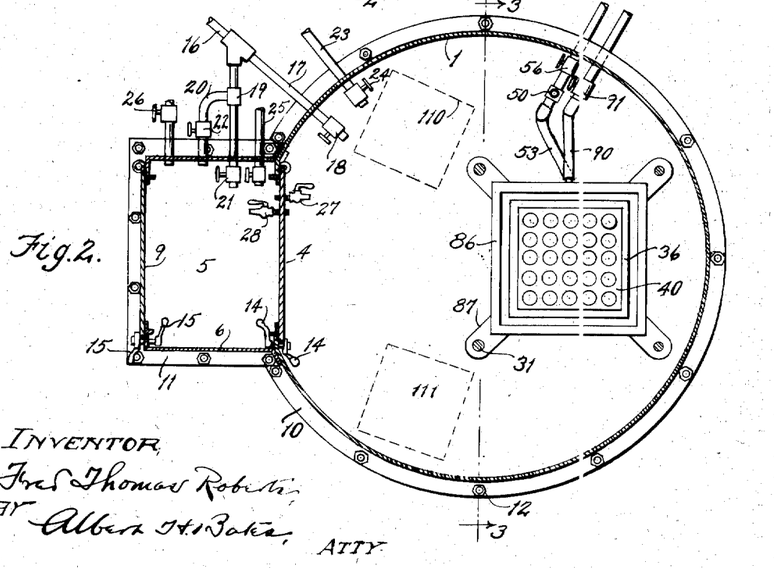
Fig. 2 is a sectional plan of such apparatus.
Figure 3:
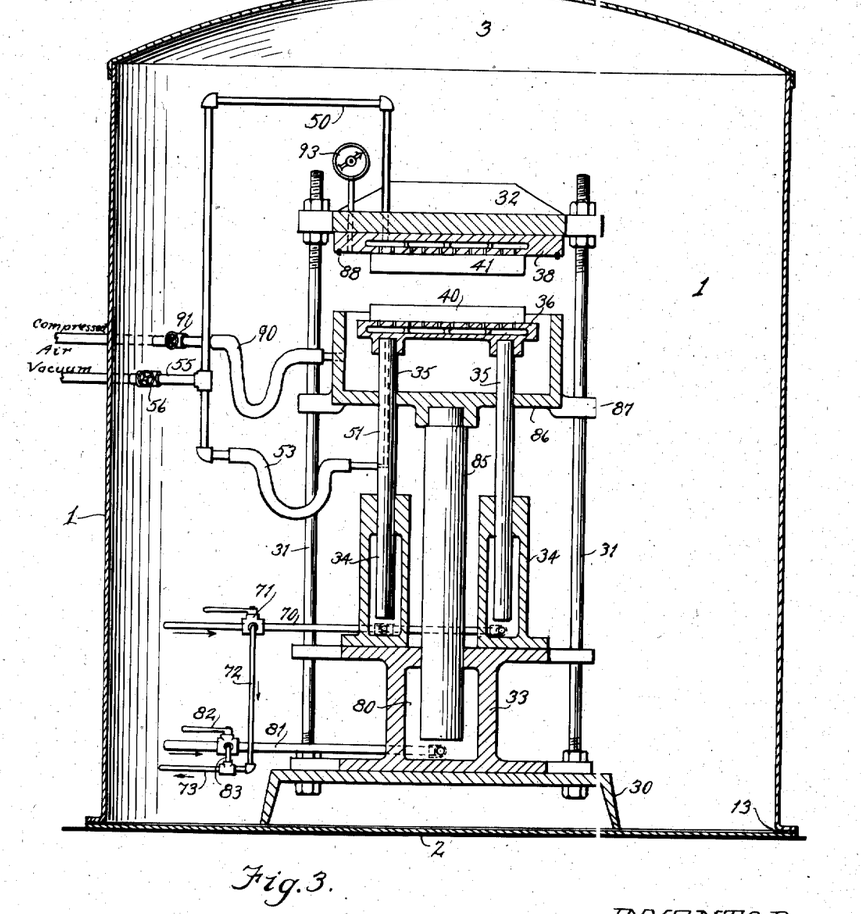
Fig. 3 is an elevation, on a larger scale, of the molding press shown in Fig. 1, this view being at right angles to the plane of Fig. 1.

In Figs. 1, 2 and 3, an air-tight room is shown comprising a partially cylindrical wall 1, a base 2, a cover 3, and a door 4. This door also forms the inner door of the air lock, which comprises a rectangular chamber bounded by an extension 5 of the base, vertical walls 6 and 7 and a top 8. An outer door 9 completes the air lock.

The vertical walls, tops and base shown are secured together in an air-tight manner. It is convenient to rivet the tops to the vertical walls and rivet the walls 6 and 7 to the cylindrical wall 1 and provide these walls with base flanges 10 and 11, by which they may be secured to the base 2 by bolts 12, a suitable gasket 13 being employed between the flange and base. This enables the body of the casing and lock to be separated from the base and elevated to allow the mold press to be conveniently installed on the base.

Suitable gaskets are provided around the borders of the doors 4 and 9, to enable these doors to make an air-tight connection, and the doors are provided with locking levers 14 and 15, enabling either door to be locked or unlocked from within the air lock or on the other side thereof.

16 indicates a pipe adapted to convey compressed air from a suitable pump or other source. One branch 17 of this pipe leads into the air room and is controlled by a valve 18 therein, and other branches 19 and 20 lead into the air lock, being controlled by valves 21 and 22, respectively inside of the lock and outside of it. 23 indicates a vent pipe from the air room to the outer air, being controlled by a valve 24 within the room. 25 and 26 indicate vent pipes from the air lock, controlled by suitable valves inside and outside of the lock respectively. 27 and 28 indicate valved passageways which may be provided between the room and air lock, to insure equalization of pressure. Suitable pressure gages, will be provided for the room and air lock, as well as suitable means for illuminating the interiors. These, and other accompaniments adding to the conveniences of operation, are not shown.

From the above description it will be seen that the air under a pressure in which a workman may conveniently operate may readily be maintained within the room, and while access to or from the room may be effected through the air lock, without disturbing the internal pressure. This air lock also enables the passage of molds and material to and from the room.

The air pressure in which a human being can conveniently and healthfully work, is, of course, limited; but such pressures as are permissible are entirely sufficient for many purposes for which my system may be used. The apparatus shown in Figs. 1, 2 and 3, however, provides for entrapping in the article a still higher pressure, if desired, as heretofore referred to. This may be more apparent as the following description proceeds.

30 in Figs. 1 and 3 indicates the base of the mold press from which rise standards 31 carrying a head 32. On the base is shown a frame 33 carrying a pair of cylinders 34, from which rise plungers 35, which carry at their tops a hollow platen 36. A hollow platen 38 is also shown as secured to the under side of the head 32. Each of these platens has passageways which communicate with cavities in mold members 40 and 41 secured to the respective platens.

Figure 4:
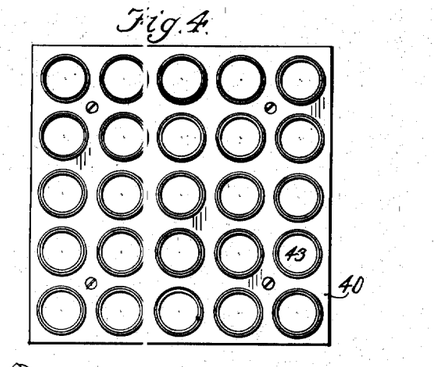
Fig. 4 is a plan of a mold plate which may be employed.
Figure 5:
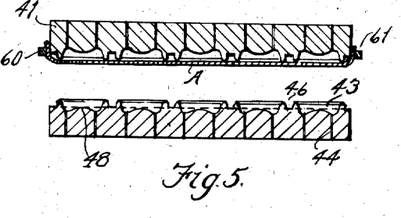
Fig. 5 is a cross section of two of such plates, showing their relative position before they are brought together.

Figs. 4 and 5 illustrate one form of mold plates, which may be secured to the platens by screws 42. The cavities 43, as they appear in Fig. 5, have a peculiar shape, which will be hereinafter referred to. These cavities have vents 44 which are adapted to register with openings in the hollow platens. 50 (Fig. 3), indicates a vent pipe leading from the platen 38. 51 is a vent passageway within one of the plungers 35 leading from the platen 36. This passageway communicates with a flexible pipe 53. The pipes 50 and 53 are shown as joining and leading outwardly by a T-connection through the pipe 55, which is provided with a valve 56.

By means of the piping described and the valve 56, the operator may place the mold cavities in communication with the outer air. Accordingly, if an air pressure be maintained within the room and rubber stock be placed across the mouths of the cavities of one of the molds, and that mold caused to communicate with the outer air, the pressure within the room will force the stock into the cavity. It is convenient to vent both molds at the same time, and accordingly the venting pipes 50 and 53 are brought together and one valve provided, instead of having separate valves, as might be done if desired.

Figure 6:
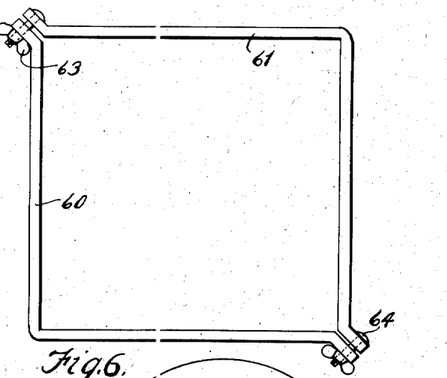
Fig. 6 is a plan of a clamp which may be used to hold a rubber sheet to one of the mold plates, as illustrated in Fig. 5.

Fig. 5 shows a sheet of stock A held across the upper mold, and a similar sheet may be held across the lower mold. It may be desirable to clamp this sheet at the edges of the mold. For that purpose, I may provide a rectangular frame, shown in Fig. 6. This frame, as shown, consists of two members 60 and 61, each extending around two sides of the mold and provided at their ends with means for drawing the members together, as for example, the thumb nuts 63 on bolts 64. For some purposes it may be sufficient to simply lay the stock across the mouths of the molds and then vent them. Or the vents may be slightly opened and then the rubber stock placed against the mold face, when it will immediately sink into the cavities.

After the molds have been vented, so that the pressure within the room has seated the stock in the mold cavities, the molds are brought together to bring the two parts of the article into conjunction, thus entrapping within each article air having a pressure equal to that surrounding the mold. It is convenient to bring the mold members together by hydraulic pressure. For this purpose cylinders 34 and plungers 35 are provided. 70 indicates a pipe adapted to convey liquid under pressure to the cylinders 34. 71 is a valve controlling this pipe, adapted to place it in communication with the supply, or close it entirely, or drain it through the pipes 72—73.

Figure 7:
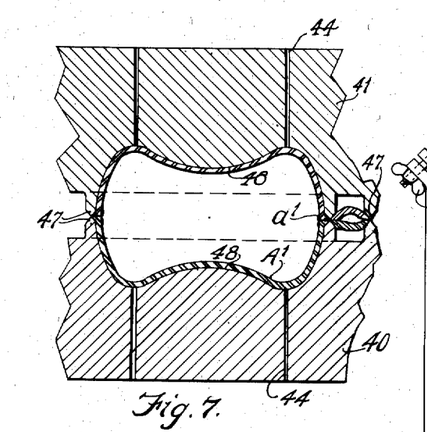
Fig. 7 is an enlarged view in vertical section illustrating one of the mold cavities and showing rubber stock in place therein.

It should be noted that when these two mold parts are brought together with rubber stock seated in them respectively, they produce a series of hollow articles, as shown at A' in Fig. 7, with air entrapped within them. I prefer to provide a depressed portion 46 of the plate about each mold cavity, and bring the walls about the cavities to substantially an edge, as shown at 47. By this construction the sheets of rubber are cut in two around the article as the mold members come together, the excess of rubber passing into the space 46 surrounding the cavities. It will be noted that the annular wall between the mold cavity and the surrounding space is tapered both inwardly and outwardly, in coming to the cutting edge. This enables the rubber of the two sections to be squeezed together between mold surfaces, as the molds come together, thus making an effective seam. The outward rib thus produced is absorbed in the vulcanization.

As heretofore mentioned, for many purposes pressure of air in which the operator may conveniently work may be as high as desired within the article, and in such case it is only necessary to provide so much of the apparatus as has been described, or a substitute for those parts, as hereinafter referred to. For some purposes, however, it is desirable to obtain within the article a higher pressure than it is healthful for the operator to continuously breath. For this purpose I provide the additional portion of the mechanism which will now be described.

Within the frame member 33 is a central hydraulic cylinder 80, adapted to be fed by a pipe 81, controlled by a valve 82, which may drain through the passageway 83 to the pipe 73. Rising from this cylinder 80 is a plunger 85 carrying a box 86, which has ears 87 slidably embracing the standards 31. The plungers 35 extend through the base of this box 86 in a slidable but airtight manner, stuffing boxes being omitted for simplicity of illustration. Directly above the wall of the box 86 is a rectangular gasket 88, carried on the under side of the platen 38. 90 indicates a pipe for compressed air passing from outside of the room to the interior of the box 86, this pipe being connected with the box by a flexible connection and being controlled by a valve 91.

Now if it be desired to entrap within the article air of a higher pressure than that within the room, the parts of the rubber stock are caused to seat in their cavities by opening the vent valve 56, as already described; then, before the mold parts are brought together, the valve 82 is opened and hydraulic pressure admitted to the cylinder 80, which raises the box 86 and forms a closed chamber about the mold members. Then the valve 91 is opened and compressed air of any pressure desired is admitted to the interior of the box 86, the pressure being indicated by the gage 93. When the desired pressure is obtained within the box the valve 71 is opened and the plungers 35 raised, thus closing the mold within this surrounding air of higher pressure.

After the parts of the article have been brought together within a surrounding atmosphere of compressed air (either the air which fills the entire room or the comparatively high pressure air within the box), it is desirable to remove the articles from the molds 40 and 41 for vulcanizing. By removing them and vulcanizing them in a separate mold, and outside of the press shown, one press may be operated continuously in the formation of the article, and vulcanization of a number of molds may be performed at one time in a vulcanizer. This has advantages of economy of equipment over vulcanizing in the press where the article is formed.

Figure 8:
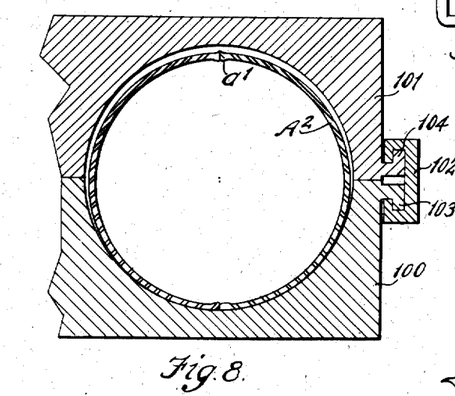
Fig. 8 is a view on the same scale as Fig. 7, showing a vulcanizing mold which may be employed with the article illustrated in Fig. 7.
Figure 9:
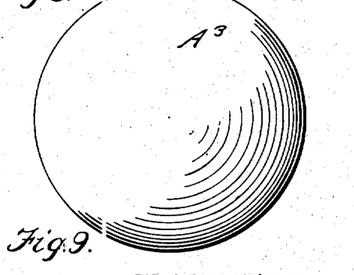
Fig. 9 is an outside view of a ball produced by the molds shown in Figs. 7 and 8.

In the operation of the apparatus without employing the higher air pressure and without using the box 86, air of a pressure equal to that which is within the room generally is entrapped within the article. Then, after the molds are separated, the articles are taken out of the molds and placed in another mold within the same room, which mold is clamped together to hold the articles with the entrapped air. This mold is then removed for vulcanization. Such a mold is illustrated in Fig 8, and is shown as having two mold plates 100 and 101, clamped together by a beveled wedge-shaped stirrup 102, which overhangs wedge ribs 103 and 104 on the mold members.

It is convenient, of course, to have a comparatively large number of these vulcanizing molds within the room, which are filled one after the other, clamped, and removed together, to avoid air-losses in the lock. 110 and 111 in Fig. 2, illustrate two supports or tables adapted to carry respectively empty molds and filled molds, and it is to be understood that after the operator has filled a sufficient number of molds for vulcanizing, he places them in the air lock 5, and closes the door 4. The air pressure is then reduced within the air lock from the outside (by means of the external valve on the vent 26), and then the supply of molds is removed and a supply of empty molds placed in the air lock, the door closed and the pressure built up, through the passageway 20 controlling the external valve 22.

During the operation of transferring the closed articles which contain simply the room-pressure of air, from the mold press to the vulcanizing mold, there is no tendency of the articles to separate, because the pressure outside of the article is the same as that within it. I find, however, that the adhesion of the raw rubber will hold a considerable air pressure within the articles, and the pressure supplied to the box 86 exceeds the air pressure within the room by an amount which should be less than that which the adhesion of the raw rubber will hold. Accordingly, by using the pressure in the room and also the pressure within the box, I can have the advantage of obtaining a higher pressure within the article than the adhesion of the raw rubber itself will hold, and a higher pressure than it is healthful for an operator to work in. I can, accordingly, obtain this high pressure and still have the cheapness of operation resulting from transferring the molded articles from their forming molds to vulcanizing molds.

To make a concrete illustration of this built-up air pressure within the article, suppose the adhesion of raw rubber stock will hold a pressure of fifteen pounds per square inch above the atmosphere, and suppose that an operator may conveniently work in an air pressure of twenty-five pounds. Then if the article were closed within a chamber containing an atmosphere of compressed air of over fifteen pounds pressure, as described in my prior Patent No. 1,146,523, issued July 13, 1915, it would not be feasible to transfer the article in the open air to another mold for vulcanizing, because the internal pressure would cause it to separate. Hence, in carrying out the process of that patent the article has been vulcanized in the same mold in which it was placed to entrap air. If, however, the article be closed by the present process, in a room containing an air pressure of twenty-five pounds, it may readily be transferred to a vulcanizing mold while the latter is in that room, and thus a pressure of twenty-five pounds obtained within the article.

Now by combining the air-room and the internal pressure chamber I may maintain a pressure of twenty-five pounds in the room and forty pounds in the box 86. Accordingly, I will entrap air of forty pounds pressure within the article (which pressure, it is assumed, would be inconvenient for the operator to work in), and still may avail myself of the economy of transferring the article to another vulcanizing mold in the room, because the difference between the internal and external pressure in the article is only fifteen pounds. It is to be understood that the actual pressures of fifteen, twenty-five and forty pounds above referred to, are selected simply as illustrative, and will vary with circumstances.

It should be noted that the opening of the box 86 discharges the higher pressure air into the room and thus to a greater or less extent may compensate for leakage from the room. In any event, the pressure in the room is maintained at the desired amount (indicated by some suitable gage, not shown) by occasional operation of the admission and venting valves 18 and 24. The vent pipe 23 may conveniently lead from the bottom of the room and the admission pipe 17 enter at the top, so that the operator may use these pipes for supplying fresh air as needed for respiration, the vent valve 24 being occasionally opened to allow the exit of the carbonic acid which would accumulate near the floor.

Figure 10:
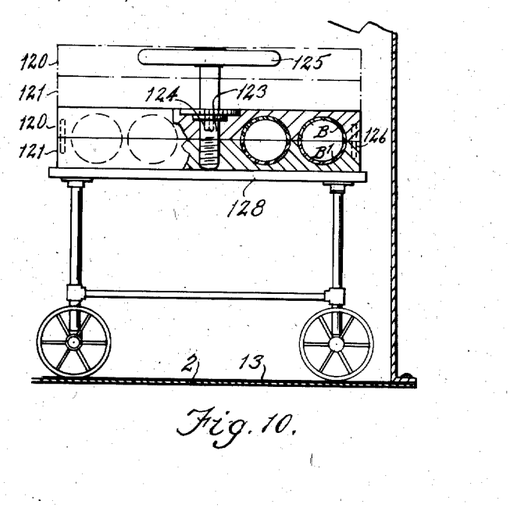
Fig. 10 is a side elevation of a simpler form of mold press, which may be employed for some purposes.
Figures 11, 13, 14, 15:
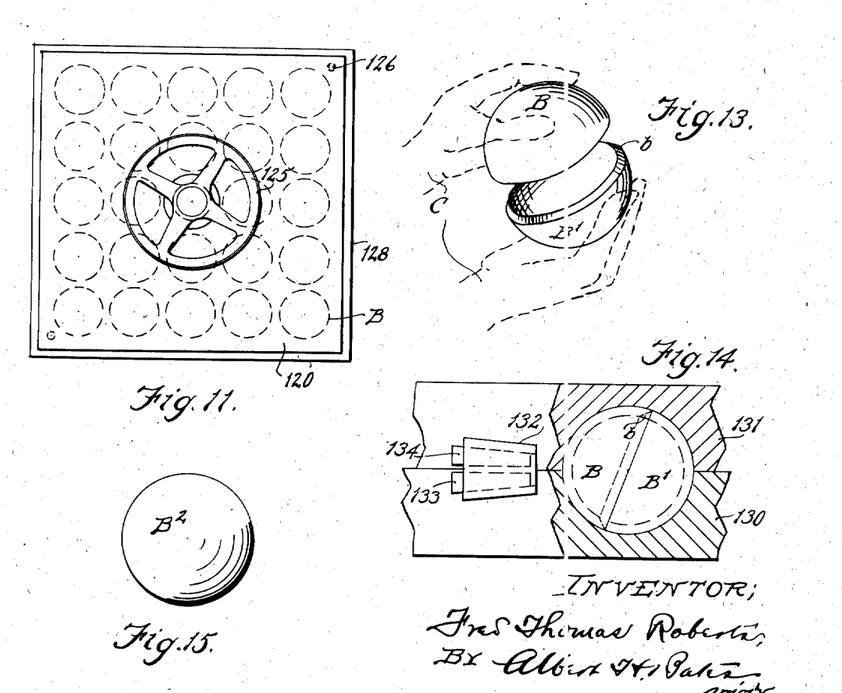
Fig. 11 is a plan of such mold press.
Fig. 13 is a perspective view illustrating a hand operation of bringing two article-parts together.
Fig. 14 is a vertical section through a vulcanizing mold for use when the hand operation illustrated by Fig. 13 is employed.
Fig. 15 is an outside view of the article produced by either the mold shown in Fig. 12, or that in Fig. 14.
Figure 12:
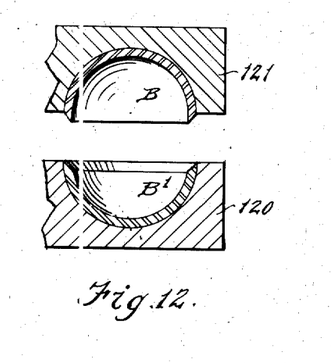
Fig. 12 is a vertical cross section, on an enlarged scale, through one of the mold cavities of the mold plates shown in Figs. 10 and 11.

While the above described press is very satisfactory for accomplishing the entrapping of air, whether it be of higher pressure than that in the room or of the same pressure, a much simpler form of press may be used in the latter case. Such simpler form is illustrated in Figs. 10, 11 and 12, where 120 and 121 are two cavitary mold plates adapted to be held separated or snugly brought together by a screw 123. This screw is shown as having a head 124 rotatably held to the mold plate 120, having threads engaging internal threads in the mold plate 121. A removable socket wrench 125 provides means for rotating the screw. Dowel pins 126 properly position one mold plate over the other. This mold press may conveniently be carried on the portable support indicated at 128.

In operating the mold press just described, hollow semi-cured hemispheres, shown at B, B', may be supplied to the operators within the room. Such operators separate the mold plates sufficiently to insert these hemispheres and then turn down the screw, bringing the parts together to entrap the air of the pressure within the room. If the article to be made in this form is a ball, it may conveniently have overlapping beveled diametric edges, as indicated at *b* in Fig. 12, and as claimed in my Patent No. 1,151,396, issued Aug. 24, 1915. After the parts of the article are brought together, thus entrapping air of the pressure within the room, the mold with its closed articles is removed and placed in the vulcanizer. It is convenient to allow a number of these molds to accumulate in the room, to prevent loss of air in the air lock.

Figs. 13 and 14 illustrate a still simpler way of making an inflated hollow rubber article. In this case the two article-sections (shown as hollow hemispheres B, B', with beveled edges *b*), have cement placed on their meeting edges and are simply brought together by hand in the room, as illustrated by the operator's hands C in Fig. 13. When the parts of the article are thus brought together, inclosing air of a pressure equal to that in the room, the closed article is placed in a vulcanizing mold within the room. Such mold is illustrated in Fig. 14, comprising the plates 130 and 131, and a suitable clamp for holding them together. This clamp may consist of a wedge-shaped stirrup 132 overhanging wedge-shaped ribs 133 and 134, as heretofore explained in connection with Fig. 8. The article is placed in this mold with the diametric seam out of registration with the faces of the molds, as illustrated in Fig. 14, the result being that the seam has a very firm surface to rest against during vulcanization, and effective joining is accomplished.

Fig. 15 illustrates a ball B² made in either the molds of Fig. 10 or those of Fig. 14. In operating with semi-cured stock the adhesion is not as great as with raw rubber stock, but where the internal air is at the same pressure as that within the room there is no tendency of the parts to separate before being placed in the vulcanizing mold, and that mold holds them in shape until they are vulcanized and the seam thus cured.

Figs. 5 and 7 show a peculiar form of mold adapted for use in making a ball. I have found that in pneumatically forcing rubber stock into cavities the effect is to stretch the stock most at the central portion, leaving it thicker adjacent to the edges of the mold, and, accordingly, it is difficult to make, by such process, a wall of uniform thickness from initial stock which has a uniform thickness. To save the expense and difficulties of forming the stock of irregular thickness, to compensate for the different stretching, I have devised the mold shown in Figs. 5 and 7, wherein there is an inward protuberance 48, which supports the central portion of the stock and causes the stretching action to take place where needed, instead of at the center.

A point to be noted about this mold is that this inward protuberance merges by easy curves with the spherical zone of the mold and is of such size and shape that the superficial area of the mold is substantially the same as that of a spherical mold of the same diameter. The result is that when the article is forced pneumatically to its seat in the distorted mold shown, it is of substantially the same thickness throughout and is of the proper size to become a sphere, without serious stretching.

Another advantage of a forming mold having inward protuberances is that when the formed article assumes its true shape it has an increased cubical content, resulting in a corresponding reduction in internal pressure. Accordingly the compressed air entrapped within the formed article may exceed the pressure of the surrounding atmosphere by even a greater amount than can be retained simply by the adhesion of raw rubber; for, as the article is removed from the forming mold, the first action will be for the internal pressure to force the dents outwardly and thus reduce such pressure.

When the distorted ball is removed from the mold of Figs. 5 and 7, it is put into a spherical vulcanizing cavity, as shown in Fig. 8. It is convenient to make the article slightly smaller in diameter than that of the vulcanizing cavity, as illustrated in Fig. 8, as this provides for the expansion of the article during vulcanization and also enables the article to be very readily placed in the vulcanizing mold.

If the internal pressure in the article is greater than the atmosphere in the room, the article will assume a spherical shape as soon as removed from the mold of Figs. 5 and 7. If the higher internal pressure, obtained by using the box 86, is not employed, the article may be of a dented shape when it is placed in the vulcanizing mold, but it will assume true spherical shape when the vulcanizing mold is removed from the room, as the air in the mold cavity outside of the article will leak out between the mold plates.

My prior application No. 82,272, filed March 6, 1916, shows and claims a system of removing hollow inflated articles from molds, consisting of opening the mold, as it comes from the vulcanizer, within an air chamber containing air under pressure, this air being reduced in pressure after the mold is opened. This operation prevents concentrated bulging of the article at the line of separation. Now my air room operation, described and claimed herein, may accomplish an analogous result. The molds, clamped shut with their inclosed articles, may be taken from the vulcanizer, and, after cooling, passed into the air room, and there opened. The pressure within the article is thus entirely or partly counterbalanced, by the external pressure in the room, and the troublesome concentrated bulging does not result. At some convenient time the finished articles are removed from the room through the air lock, where the pressure is gradually reduced. There is, accordingly, no strain on the article.

It will be seen from the above description that the apparatus shown is adapted for a number of different specific operations in performing my process. The apparatus is of my invention, and important and novel parts thereof are claimed herein, but I do not wish to be limited to the apparatus shown, as the process may be performed with various forms of apparatus, as already explained. It is operated somewhat differently when using semi-cured molded rubber sections than when making the articles from raw rubber, pneumatically seated. The additional step of giving the super-pressure within the article is also of value, but need not be employed unless desired.

Reference should be made to my prior applications No. 51,338, filed September 18, 1915, and No. 55,131, filed October 11, 1915, for claims covering the process of pneumatically seating the stock in vented mold cavities, by a superior pressure within the article, and covering also the mold press having mold plates and hollow platens, as shown in Fig. 3.

Having thus described my invention, what I claim is:

1. The process of making hollow articles of plastic material consisting of bringing the parts together within a room occupied by the operator and containing air under pressure.

2. The process of making hollow articles of plastic material consisting of bringing the parts together within a room occupied by the operator and containing air under pressure, holding the closed article in a vulcanizing mold, and vulcanizing the article while so held.

3. The process of making hollow rubber articles consisting of bringing the parts of the article together in a room occupied by the operator and filled with compressed air, holding the parts together by mechanical means while they are removed from the air room, and vulcanizing the article outside of the air room.

4. The process of making hollow rubber articles consisting of bringing the parts of the article together in a room occupied by the operator and filled with compressed air, holding the parts together by a vulcanizing mold closed within the air room, removing such mold with its inclosed article from the air room, and vulcanizing the article while in said mold.

5. The process of making hollow rubber articles consisting of bringing the parts of the article together in a surrounding atmosphere of compressed air, then transferring the article to a vulcanizing mold located in such compressed air atmosphere, closing the mold in such atmosphere, and vulcanizing the article.

6. The process of making hollow articles consisting of bringing the parts of the article together in a surrounding atmosphere of compressed air, transferring the article to a vulcanizing mold while in the same surrounding atmosphere, locking said mold shut, removing it from the atmosphere, and vulcanizing the article while in said mold.

7. The process of making hollow rubber articles consisting of bringing the cup-shaped parts of the article while retained in mold members into edge engagement in a room occupied by the operator and containing air under pressure, then transferring such article to a separate vulcanizing mold in said room and closing the mold, then removing such closed mold from such room, and vulcanizing the article while it remains in that mold.

8. The process of making hollow rubber articles consisting of closing the parts of the article within an atmosphere of compressed air in a room occupied by the operator and to which access is had by means of an air lock, and thereafter vulcanizing the closed article.

9. The process of making hollow rubber articles consisting of closing the parts of the article within an atmosphere of compressed air in a room occupied by the operator and to which access is had by means of an air lock, placing such closed article within a mold and closing the mold while in said room, and removing the closed mold from said room by means of an air lock, and vulcanizing the article while in said mold outside of said room.

10. The process of making hollow rubber articles consisting of bringing the parts of the article together in an atmosphere of compressed air, then placing such closed article while in such atmosphere in a vulcanizing mold with the seam of the article out of registration with the separation faces of the mold, and vulcanizing the article while held in such mold.

11. The process of making a hollow rubber ball consisting of bringing hemispherical sections together in a room occupied by the operator and filled with compressed air, then placing such closed ball in a two-part spherical mold with the seam out of registration with the separation faces of the mold, locking such mold, removing it from the air room, and heating the mold to vulcanize the article.

12. The process of making hollow rubber articles, consisting of bringing the parts of the article together in an atmosphere of compressed fluid, such parts being held in mold cavities which have inward protuberances, then transferring such closed article to a vulcanizing mold having a cavity of the shape of the finished article, and thereafter vulcanizing the article while in such vulcanizing mold.

13. The process of making hollow rubber articles consisting of bringing the parts of the article together in a room occupied by the operator and filled with compressed air, such parts being held in mold cavities which have inward protuberances, then transferring such finished article to a vulcanizing mold having a cavity of the shape of the finished article, then removing said vulcanizing mold from the air room, and vulcanizing the article outside of the air room.

14. The process of making hollow articles of plastic materials, consisting of placing rubber stock across the mouth of a mold cavity, and, while the mold is located in an atmosphere of compressed fluid, venting the cavity to the outside to allow the compressed fluid pressure to force the stock to seat in the mold cavity, bringing such formed part into conjunction with another part, and curing the closed article.

15. The process of making hollow rubber articles, consisting of placing raw rubber stock across the mouth of a mold while the mold is located in an inclosure containing air under pressure, venting the mold cavity to a point where as high an air pressure does not exist, whereby the rubber stock is seated in the cavity, then bringing such seated stock into conjunction with other stock to form a closed article with compressed air within it, and then vulcanizing the article.

16. The process of making hollow rubber articles, consisting of placing rubber stock across the mouth of a mold cavity, while the mold is located in an atmosphere of compressed air, venting the cavity to the outside air to allow the compressed air pressure to force the stock to seat in the mold cavity, bringing such formed part into conjunction with another part to entrap compressed air, transferring the closed article to a vulcanizing mold and vulcanizing it therein.

17. The process of making hollow articles by the employment of an air-tight room in which the operator works and which contains air under pressure, consisting of placing plastic stock in such room across the mouth of mold cavities, venting such cavities to the outside air whereby the pressure in the room seats the stock, and bringing two of such seated parts together in said room to entrap compressed air between them.

18. The process of making hollow rubber articles consisting of placing raw rubber stock across the mouths of mold cavities in a mold contained in a room in which the operator works and which is filled with compressed air, venting such cavities to the outside air, whereby said compressed air seats the rubber in the cavities, bringing two of such seated parts together in said room to entrap compressed air within the article, transferring the closed article while in the room to a vulcanizing mold and vulcanizing the article.

19. The process of making hollow rubber articles, consisting of placing rubber stock across the mouth of a mold cavity, while the mold is located in a room in which the operator works and which is filled with compressed air, then venting the cavity to the outside air to allow the compressed air pressure to force the stock to seat in the mold cavity, then bringing such formed part into conjunction with another part in the same room to entrap air under pressure within the article, then transferring such article while in the room to a vulcanizing mold which is then closed, removing the vulcanizing mold from the room and thereafter vulcanizing the article therein.

20. The process of making hollow articles, comprising the placing of plastic stock across the mouth of a mold cavity which is inwardly distorted from the shape which the finished article is to have, venting such cavity while supplying compressed fluid to the other side of the stock, bringing such seated part into conjunction with another part to make a closed article, then transferring such article to a mold having the shape of the finished article, and curing the article while so held.

21. The process of making hollow rubber articles, comprising the placing of rubber stock across the mouth of a mold cavity while said cavity is located within an inclosure which contains air under pressure, said mold cavity being inwardly distorted from the shape which the finished article is to have, venting such cavity to a point outside of the inclosure, to cause the compressed air to seat the article, bringing such seated part into conjunction with another part to make a closed article containing air, then transferring such article to a mold having the shape of the finished article, and vulcanizing the article while so held.

22. The process of making hollow articles of plastic material consisting of closing the article within an atmosphere of compressed fluid, which atmosphere is contained in a separable casing located in a room containing compressed fluid of lower pressure, removing the article from the high pressure chamber into the low pressure room and placing it in a mold in such room, and curing the article.

23. The process of making hollow rubber articles consisting of closing the article within an atmosphere of compressed air, which atmosphere is contained in a separable casing located in a room containing compressed air of lower pressure, removing the article from the high pressure chamber into the low pressure room and placing it in a mold therein, removing such mold in a closed condition from such room and thereafter heating it to vulcanize the inclosed article.

24. The process of making articles containing fluid under pressure comprising the bringing of the parts of the article together in an atmosphere of fluid under pressure which is contained within a casing located within a room in which the operator works and which contains air under pressure but of a lower pressure than that within the casing, then opening the casing and removing the article into the room, and placing it in a mold therein.

25. The process of making inflated rubber articles containing fluid under pressure comprising the bringing of the parts of the article together in an atmosphere of air under pressure which is contained within a casing located within a room in which the operator works and which contains air under pressure but of a lower pressure than that within the casing, then opening the casing and removing the article into the room and placing it in a vulcanizing mold located in the room, then closing the vulcanizing mold and removing it from the room and heating it to vulcanize the article.

26. The process of making hollow articles having an internal air pressure, consisting of placing stock for the article across the mouth of a mold cavity which is located in an inclosure which contains compressed fluid, venting the cavity to a point outside the inclosure to enable the compressed fluid to seat the stock in the cavity, forming a smaller inclosure about the seated article and supplying fluid under still higher pressure to said smaller inclosure, bringing the seated article while in said smaller inclosure into conjunction with other stock to entrap high pressure fluid within it, removing the article into the larger inclosure, and placing it in a mold therein, and curing the article.

27. The process of making hollow rubber articles having an internal air pressure consisting of placing stock for the article across the mouth of a mold cavity which is located in a room in which the operator works and which contains compressed air, venting the cavity to a point outside the room to enable the compressed air to seat the stock in the cavity, forming an inclosure about the seated article within the room and supplying air under still higher pressure to said inclosure, bringing the seated article while in said inclosure into conjunction with other rubber stock to entrap high pressure air within it, opening the inclosure and removing the article to a place in the room outside of said inclosure, placing the removed article in a vulcanizing mold in said room, and heating said mold to vulcanize the article.

28. An apparatus for carrying out the process described comprising a room adapted to house the operator, means for admitting compressed air to the room, a cavitary mold in the room, and means for causing pneumatic communication between the mold cavity in the room and a point outside of the room.

29. An apparatus for carrying out the process described comprising a room provided with an air lock, means for admitting compressed air to the room, and means for venting a mold cavity in the room to a point outside of the room.

30. In an apparatus of the character described, the combination with suitable walls providing a closed air chamber, an air lock adapted to communicate with said chamber and having two doors leading to and from the lock, pipes for conveying compressed air from the interior of the room, a cavitary mold in said room, and a pipe leading from the mold cavity to a point outside of the room.

31. In an apparatus of the character described, the combination of an air-tight room, an air lock adapted to enable communication with the room, compressed air pipes and vent pipes communicating with the room and with the air lock, a mold within the room having cavities, passageways from said cavities to a point outside of the room, and a valve for controlling such passageways, whereby the cavities may be vented when desired.

32. In an apparatus of the class described, the combination of an air tight room in which an operator may work, means for maintaining an air pressure within said room, a pair of mold parts within the room, and means for bringing them together to entrap air from the room within an article seated in the mold members.

33. The combination of a room in which an operator may work, means for maintaining air under pressure therein, a mold press within the room, means for bringing the mold members together in the room to entrap air in the articles in the molds, means for locking the mold members together in the room, and an air-lock allowing the removal of the articles from the room while in the mold.

34. The combination of an air tight room, molds therein, an inclosure in the room about the molds, means for supplying compressed air to the room, and means for supplying fluid under higher pressure to the inclosure.

35. The combination of a room adapted to be occupied by the operator, molds therein having cavities, an inclosure about the molds, means for supplying compressed air to the room, means for supplying compressed air of higher pressure to the inclosure, and means for venting the mold cavities to a point outside of the inclosure.

36. In an apparatus of the character described, the combination of an air tight room, an air lock adapted to enable communication with the room, means for supplying compressed air to the room and air lock, a mold within the room having cavities, passageways from said cavities to a point outside of the room, a valve for controlling such passageways, a casing within the room, means for causing it to close the cavitary mold, and means for supplying compressed air of higher pressure than that in the room to said casing.

37. The combination of a room adapted to be occupied by the operator, a mold press therein, means for supplying compressed air to the room, means for venting the mold cavities in the press to a point outside of the room, a casing, means for placing it about the vented cavities, means for supplying compressed fluid to the interior of the casing, and means for bringing such seated article part into conjunction with another part of the article while in said casing and while the pressure therein is maintained higher than that in the room, means for then opening the casing enabling the removal of the articles with the entrapped air, and a mold in the room and outside of the casing in which such article may be placed and held.

38. In an apparatus of the character described, the combination of a cavitary mold distorted from the finished shape of the article to provide an inward projection, means for establishing an atmosphere of compressed fluid about the mold, means for venting the cavity of the mold to a point outside of said atmosphere to cause the article to seat in said cavity, and a mold of the shape of the finished article having an internal surface of substantially the same area as that of the distorted mold.

39. In an apparatus of the character described, the combination of a finishing mold corresponding to the shape of the finished article, a forming mold having substantially the same internal area as the finished mold but having an inward projection, means for venting said forming mold to the outside air, means for establishing an atmosphere of compressed air about the forming mold, whereby rubber stock placed across the mouth thereof may be seated in its cavity, and means for bringing such stock into conjunction with other stock while within the atmosphere of compressed air.

40. The combination of an air tight room adapted to be occupied by the operator, means for maintaining compressed air within said room, a vulcanizing mold, a forming mold having substantially the same internal area as the vulcanizing mold but provided with an inward projection, means for venting the said forming mold to a point outside of the room, whereby the air pressure within the room seats the stock in such mold, means for bringing two of such mold members together to cause the stock seated therein to engage other stock, whereby compressed air is entrapped within the article, and means for vulcanizing said article in said vulcanizing mold.

41. The combination of an air tight room adapted to be occupied by the operator, means for maintaining compressed air within said room, a forming mold provided with inward projections, means for venting said forming mold to a point outside of the room, whereby the air pressure within the room seats the stock in such mold, a casing within the room adapted to inclose the mold members mentioned, mechanism for operating said casing to inclose the mold members, means for supplying compressed air of a higher pressure than that in the room to said casing, mechanism for bringing parts of the seated article together in the compressed air within said casing, and a vulcanizing mold to which the article is transferred while in said room, said vulcanizing mold having its cavity corresponding in area to the forming mold but of different shape.

42. In an apparatus of the character described, a two-part mold, each member having a series of cavities bounded by walls coming to an annular edge, whereby when two of such mold members are brought together material may be sheared off around the edges of the cavities, there being vents from said cavities, and means for opening and closing the vents.

43. In an apparatus of the character described, a forming mold having a series of cavities bounded by walls coming to an annular edge, whereby when two of such mold members are brought together material may be sheared off around the edges of the cavities, said cavities having vents, means for controlling the vents, and means for establishing a greater pneumatic pressure between two pieces of interposed stock than there is between either piece of stock and the base of the cavity.

44. In an apparatus of the character described, the combination with an inclosure to which compressed fluid is supplied, of a two-part forming mold therein having a series of cavities bounded by walls which come to an annular edge and rise above the adjacent surrounding surfaces of the mold, whereby when two of such mold members are brought together interposed material may entrap fluid and may be sheared off around the edges of the cavities.

45. In an apparatus of the character described, the combination with a vulcanizing mold having substantially the form of the finished article, of a forming mold having a distorted shape but substantially the internal area of the vulcanizing mold and having a series of cavities bounded by walls coming to an annular edge, whereby when two of such mold members are brought together material may be sheared off around the edges of the cavities, means for establishing an atmosphere of compressed fluid about such mold members, and means for venting the cavities to a point outside of said atmosphere.

In testimony whereof, I hereunto affix my signature.

FRED THOMAS ROBERTS.